United States Patent
Kwon

(10) Patent No.: US 10,669,037 B1
(45) Date of Patent: Jun. 2, 2020

(54) SPRING-LOADED FLAPS FOR AIR COOLING IN A WET ENVIRONMENT

(71) Applicant: Kitty Hawk Corporation, Palo Alto, CA (US)

(72) Inventor: Dennis Young Kwon, San Jose, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 16/696,351

(22) Filed: Nov. 26, 2019

(51) Int. Cl.
| *B64D 33/08* | (2006.01) |
| *B64C 35/00* | (2006.01) |
| *B64D 27/24* | (2006.01) |
| *B64C 27/08* | (2006.01) |
| *H01M 10/6562* | (2014.01) |
| *B64C 27/16* | (2006.01) |
| *B64C 11/46* | (2006.01) |

(52) U.S. Cl.
CPC .............. *B64D 33/08* (2013.01); *B64C 27/08* (2013.01); *B64C 27/16* (2013.01); *B64C 35/006* (2013.01); *B64D 27/24* (2013.01); *H01M 10/6562* (2015.04); *B64C 11/46* (2013.01)

(58) Field of Classification Search
CPC ..... B64C 35/00; B64C 35/002; B64C 35/006; B64C 35/008; B64D 33/08
See application file for complete search history.

(56) References Cited

U.S. PATENT DOCUMENTS

| 3,888,411 A | 6/1975 | Florine | |
| 4,964,835 A * | 10/1990 | Suto | A63H 17/00 180/122 |
| 5,195,484 A | 3/1993 | Knapp | |
| 5,242,132 A * | 9/1993 | Wukowitz | B64C 35/00 114/262 |
| 5,960,791 A | 10/1999 | Winefordner | |
| 6,119,685 A | 9/2000 | Kawashima | |
| 6,994,084 B2 | 2/2006 | Kuo | |
| 7,263,945 B2 * | 9/2007 | Little | B63B 17/02 114/292 |
| 9,683,527 B2 | 6/2017 | Tallman | |
| 9,873,486 B2 * | 1/2018 | Jackson | B63B 1/121 |
| 10,399,400 B2 * | 9/2019 | Hartshorn | B64C 39/024 |
| 2014/0061376 A1 * | 3/2014 | Fisher | B64D 27/24 244/62 |
| 2019/0033932 A1 * | 1/2019 | Ku | G06F 1/203 |

* cited by examiner

Primary Examiner — Brian M O'Hara
(74) Attorney, Agent, or Firm — Van Pelt, Yi & James LLP

(57) ABSTRACT

In an embodiment, a system for air cooling in a wet environment includes a propeller coupled to a vehicle capable of at least one of: taking off from and landing on water. The system includes a battery configured to power the propeller, a float configured to hold the battery, and a flap in the float. The flap is configured to open in response to air pressure to permit airflow into the float to cool the battery.

20 Claims, 11 Drawing Sheets

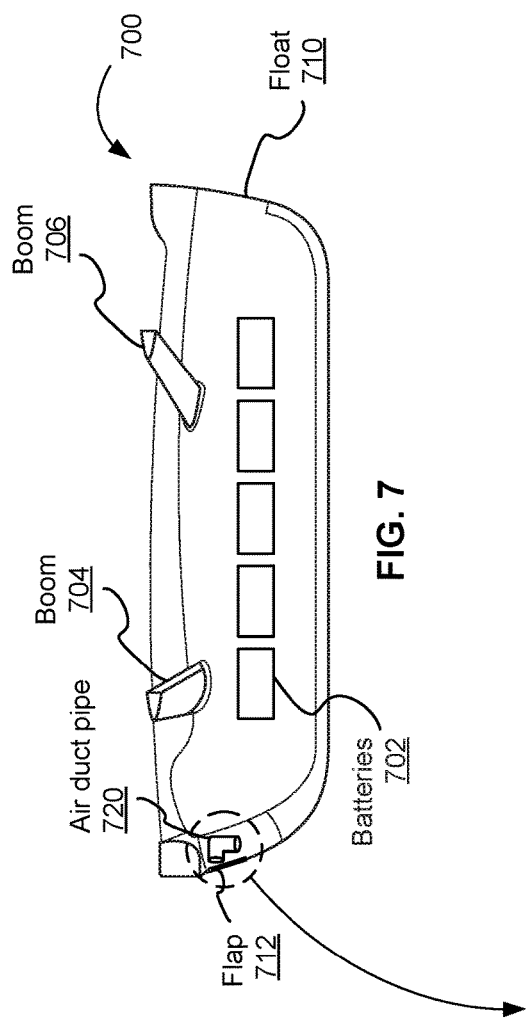
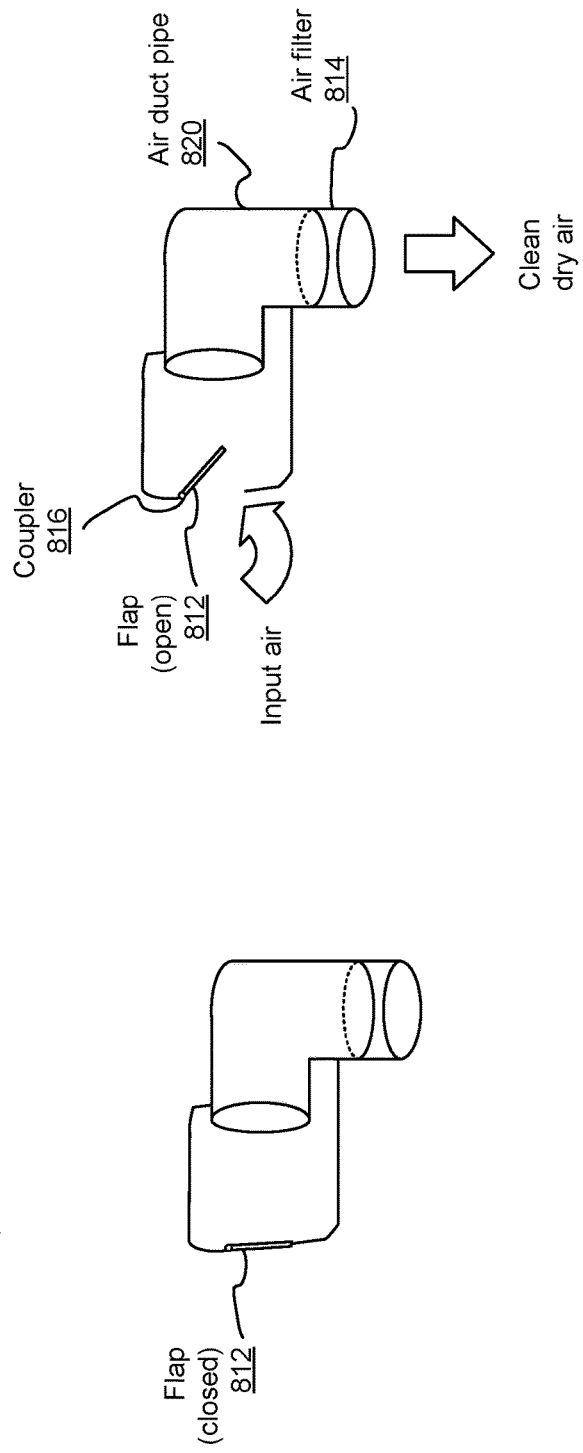
FIG. 7
FIG. 8A
FIG. 8B

SPRING-LOADED FLAPS FOR AIR COOLING IN A WET ENVIRONMENT

BACKGROUND OF THE INVENTION

New types of battery-powered vehicles are being developed that can take off and land on water. In one aspect, the batteries generate heat when used, and battery and vehicle performance may decline when the batteries generate excess heat. In another aspect, batteries may be provided in a region of the vehicle that may expose the batteries to moisture when the vehicle is on water and batteries may malfunction when in contact with moisture.

BRIEF DESCRIPTION OF THE DRAWINGS

Various embodiments of the invention are disclosed in the following detailed description and the accompanying drawings.

FIG. 7 is a diagram illustrating an embodiment of a system including spring-loaded flaps for air cooling oriented for air intake at a side of a float.

FIG. 8A is a diagram illustrating a spring-loaded flap for air cooling oriented for air intake at a side of a float in a closed state.

FIG. 8B is a diagram illustrating a spring-loaded flap for air cooling oriented for air intake at a side of a float in an open state.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of spring-loaded flaps for air cooling in a wet environment are disclosed. In some embodiments, the flaps respond to air pressure by opening via a coupler (e.g., a spring) to permit airflow through a cavity to cool electrical components such as batteries. The air cooling can be provided even in a wet environment by preventing moisture/liquid intrusion.

Figure 1:
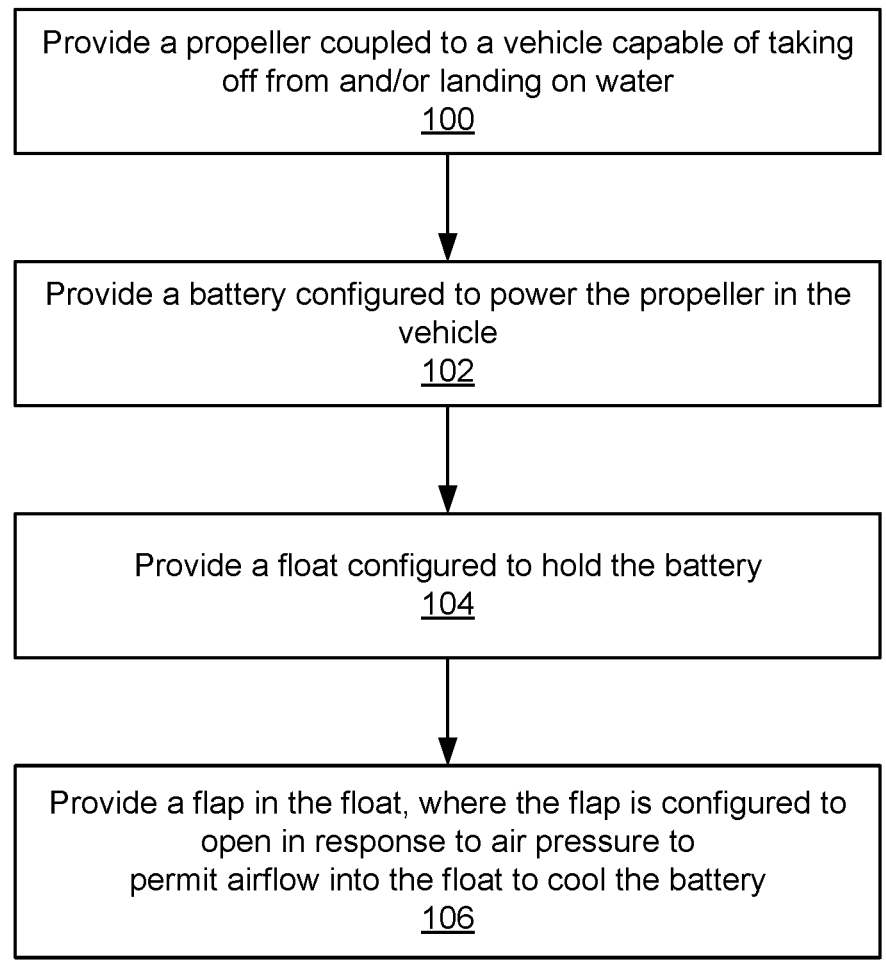
FIG. 1 is a flow chart illustrating an embodiment of a process for air cooling using spring-loaded flaps.

FIG. 1 is a flow chart illustrating an embodiment of a process for air cooling using spring-loaded flaps. In some embodiments, the air cooling is performed to cool batteries in a vehicle such as a multicopter that is capable of taking off from and/or landing on water. In some embodiments, the air cooling is provided while also preventing moisture from damaging the batteries.

Figure 2:
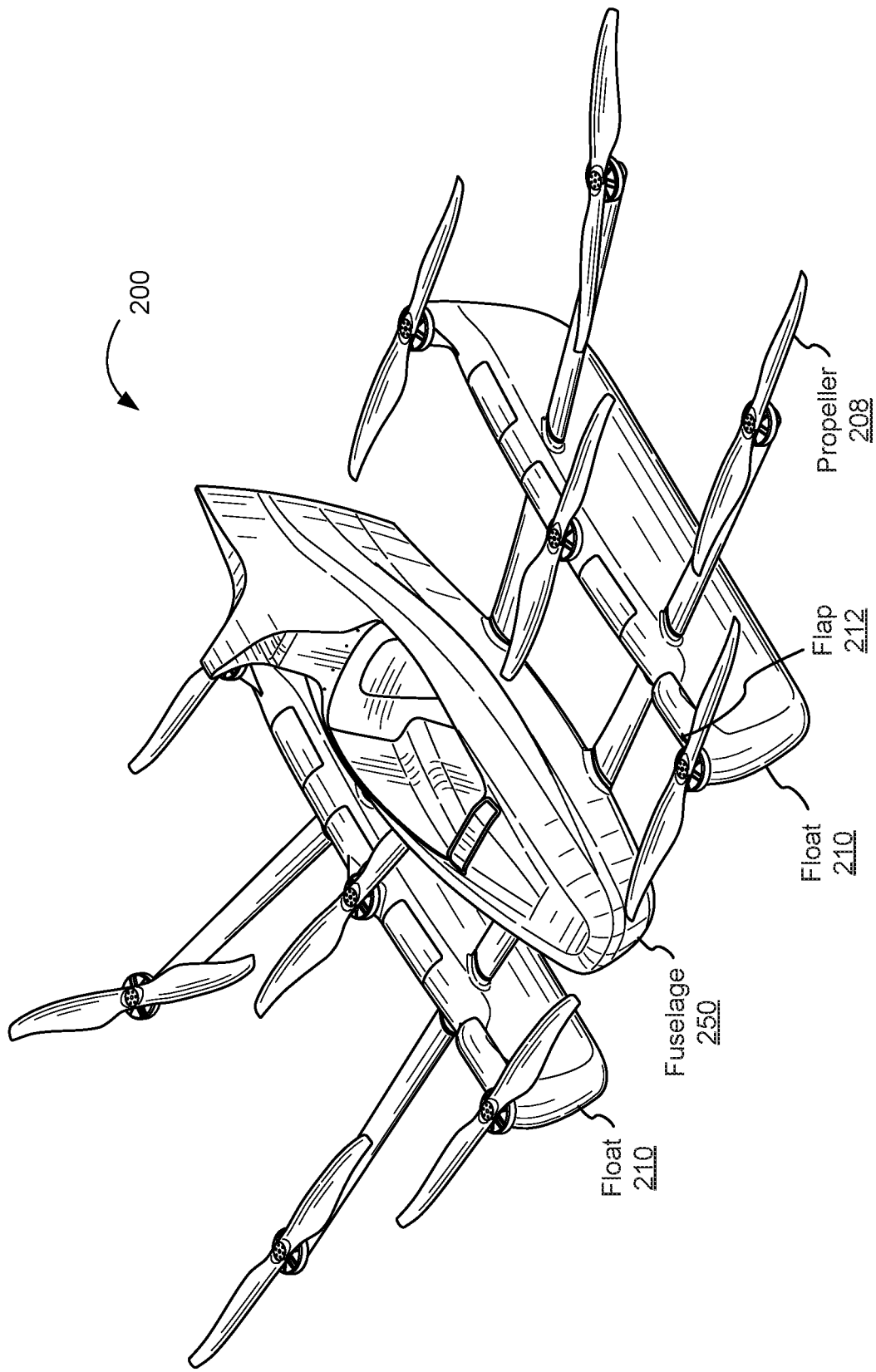
FIG. 2 is a diagram illustrating an embodiment of a multicopter with spring-loaded flaps for air cooling in a wet environment.

At 100, a propeller is provided. The propeller is coupled to the vehicle (e.g., a fuselage) and the vehicle is capable of taking off from and/or landing on water. The vehicle can be a wide-span multicopter with a number of inner rotors and outer rotors, an example of which is shown in FIG. 2.

Figure 3:
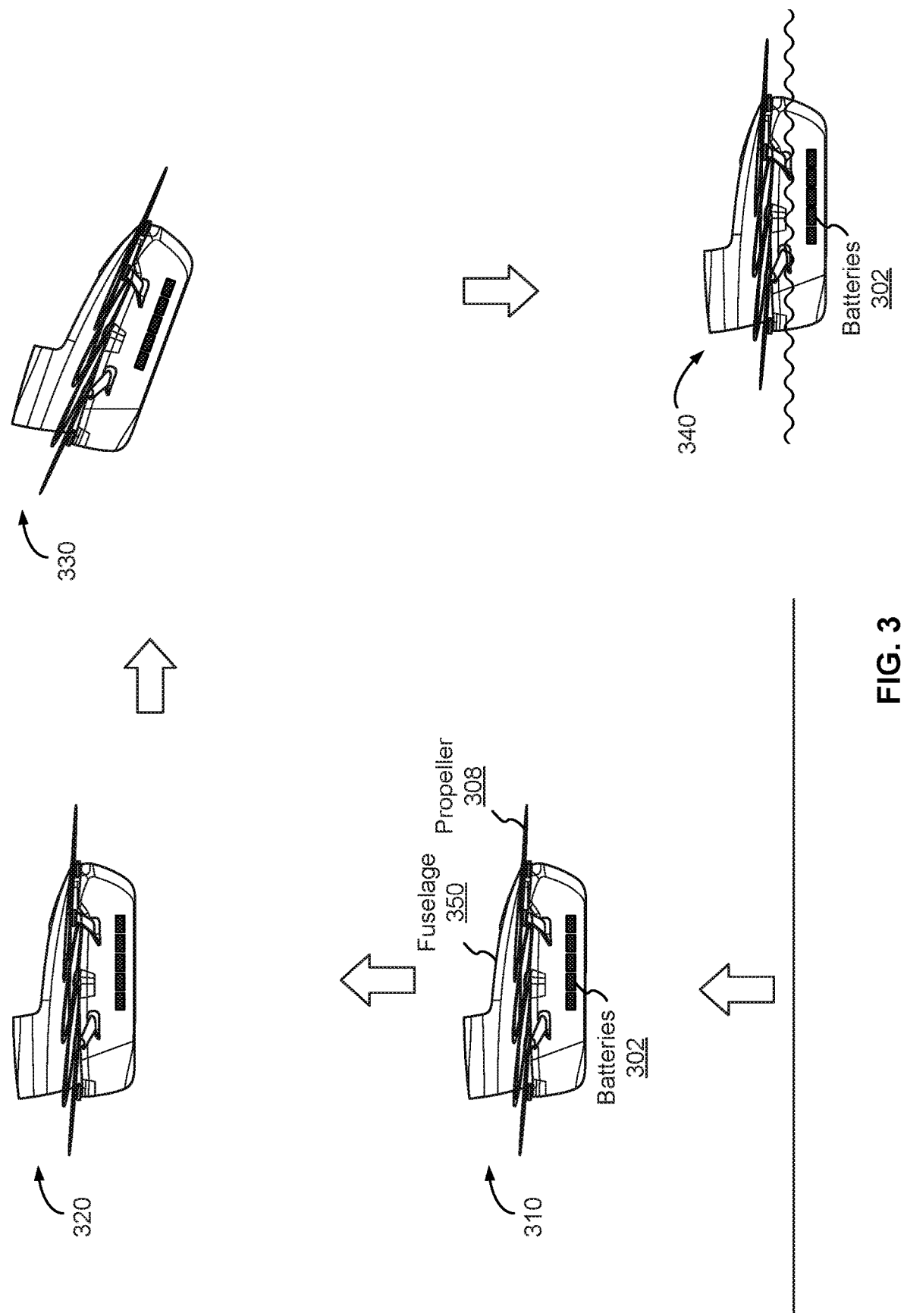
FIG. 3 is a diagram illustrating an example of a flight path of a vehicle having spring-loaded flaps for air cooling in a wet environment.

The vehicle may have various flight modes and an example flight path is shown in FIG. 3. The vehicle's flight modes are carried out by the propellers producing thrust (e.g., rotating faster or slower) independently of each other. The batteries supply an appropriate current to meet each respective propeller's needs.

At 102, a battery is provided. The battery is configured to power the propeller. A vehicle that has several propellers may be provided with an independent battery for each propeller or a flexible battery system in which a set of propellers is powered by a respective set of batteries. The necessary thrust dictates the torque required (through the propeller design) and the torque requirement dictates the necessary current (through the motor design). A flight controller may determine the necessary thrust and torque and the propeller draws a corresponding current from the one or more source batteries. In various embodiments, batteries are (re)charged when the vehicle is on the ground.

At 104, a float is provided. The float is configured to hold one or more batteries and provide sufficient buoyancy for the vehicle to float on water. Storing the batteries in the float may be desirable for safety reasons. In the event of a hard landing (assuming the aircraft does not flip over), the batteries will strike the ground before the pilot will, absorbing much of the kinetic energy of the impact and reducing impact force on the pilot. Similarly, in the event of a rollover, the batteries in the floats help to absorb energy to protect the pilot. For example, as the batteries decelerate, some of the structure in the floats is broken and/or sacrificed in order to protect the pilot.

In some embodiments, the float is carbon based (e.g., carbon fiber), which is relatively lightweight and permits a desired shape to be achieved while having thermal conductivity to dissipate the heat from the batteries. In some embodiments, to help with thermal conductivity, the walls of the float are kept relatively thin (e.g., thick enough to achieve some desired structural performance, but thin enough to sufficiently dissipate heat). The float may have various features including a flap to introduce air into the float that helps dissipate heat from the batteries as follows. This technique for introducing air into the float may be attractive because it adds very little weight to the vehicle.

At 106, a flap is provided in the float. The flap is configured to open in response to air pressure to permit airflow into the float to cool the battery. As further described below, the flap can be provided in various locations in the float including but not limited to a top surface of the float (FIG. 4) and a side wall of the float (FIG. 7). In various embodiments, during flight operation when air cooling is not needed, the flap is closed to protect the batteries and other components inside the float from water, dirt, debris, etc. When air cooling is desired, the flap is opened. In various embodiments, the flap opens by passive actuation means such as a hinge, torsional spring, a slide, inline spring load, spring-loaded Y, ball, diaphragm, spring lift disc, swing titled disc, butter fly, duck bill, etc.

In various embodiments, the flap opens by active actuation means such as an air inlet outlet exhaust port. The port includes a flap or other opening mechanism or back flow control and can be controlled using an electromechanical component such as a servo, actuator, electronic lock, or the like. Another example of an active actuation means is a temperature or pressure transducer that detects a state of the vehicle internal components (battery, electronic speed control) to signal activation of various ports.

The following figure shows one example vehicle that is manufactured/configured using the exemplary process described above.

FIG. 2 is a diagram illustrating an embodiment of a multicopter with spring-loaded flaps for air cooling in a wet environment. In this example, the vehicle 200 is an ultralight, open-cockpit multicopter. The vehicle in this example is capable of taking off from and/or landing on water.

The multicopter includes 10 propellers (one of which is labelled 208) with five propellers on each side of fuselage 250. Six of the propellers (three on each side) are inner propellers located adjacent to the fuselage and the remaining four propellers (two on each side) are outer propellers separated from the fuselage by the inner propellers. The arrangement of propellers shown here is sometimes referred to as a wide span rotor configuration. In some embodiments, the vehicle weighs 250 pounds or less and qualifies as an ultralight aircraft under federal aviation regulation guidelines.

In various embodiments, the propellers are tilted at various angles and/or placed at different heights to achieve overlaps between the propellers without colliding. Having inner propellers that overlap with each other (one example of which is shown here) is attractive because it permits a smaller, more compact footprint of the multicopter than if the inner propellers did not overlap. A propeller creates lift when the blade is traveling against the direction of wind and does not create lift when it spins in the direction of wind. By stacking up alternating propeller rotation directions one behind the next in the direction of flight (e.g., typically forwards), the multicopter may experience a consistent amount of lift and/or decreased intervals of decreased lift. In some embodiments, propellers that are opposite to each other on the aircraft (e.g., where fuselage 250 acts as an axis of symmetry) may rotate in opposing directions to balance torque.

To provide sufficient buoyancy when on the water, the vehicle includes two floats 210. The floats are also designed to have enough structural integrity to bear the weight of the vehicle and the pilot (if any) so that the vehicle is also capable of taking off from and/or landing on solid ground, as desired. Batteries that power the vehicle are provided inside the floats. The air cooling processes described herein can be used to cool the batteries while preventing moisture from entering the float.

A flap 212 is provided on the top surface of float 210 and underneath propeller 208 of the multicopter to permit airflow into the float. For simplicity and readability, only a single flap is shown in the examples here and in the following figures. This is not intended to be limiting and other numbers of flaps or locations are possible. Placing the flap underneath a propeller may be attractive because when propellers are spinning faster (causing the batteries to generate more heat), greater air pressure is created that causes the flap to open to permit airflow through the float to cool the batteries by convection.

The bottom of the fuselage 250 is at a height that is higher than the bottom of the floats 210 so that there is some clearance between the ground and the underside of the fuselage when the vehicle is on the ground.

Although the examples described herein use the vehicle shown in FIG. 2 as an example, the air cooling techniques described herein are applicable to other types of vehicles. The next figure shows an example of how the exemplary multicopter can be flown, beginning with how the pilot gets into the multicopter.

FIG. 3 is a diagram illustrating an example of a flight path of a vehicle having spring-loaded flaps for air cooling in a wet environment. The diagram shows an example of a flight path in a takeoff sequence through landing sequence including hovering and forward flight. In this example flight, the multicopter takes off vertically from land (310) and ascends vertically (320), flies forward (330), then lands in water (340).

Multicopter 310 shows the exemplary aircraft while it is performing a vertical takeoff. The multicopter is propelled by propellers 308. For context, the batteries 302 are shown inside the float. The multicopter continues to ascend vertically with its longitudinal axis substantially parallel with the ground (or, in some embodiments, slightly tilted back) to reach an altitude suitable for cruising.

Multicopter 320 shows the exemplary aircraft near the end of vertical takeoff. As the multicopter gets closer to some desired cruising altitude, the multicopter slows its vertical ascent until it comes to a stop, hovering mid-air (320). The multicopter then transitions from an entirely upward direction of movement to a direction of movement with at least some forward motion when the multicopter reaches some desired altitude at which to begin the transition (320). In one example, the altitude at which the multicopter begins the change from hover position to cruise (forward) position is an altitude which is sufficiently high enough for there to be recovery time in case something goes wrong during the transition.

From the hovering position (320), the multicopter transitions from hovering mode or style of flight to a flying forward mode or style of flight (e.g., where the multicopter flies within some 2D plane at a relatively constant altitude). From position 320, the multicopter flies substantially forward. Once in the cruise/forward position 330, the fuselage 350 of the aircraft is oriented with its nose slightly closer to the ground than its tail as shown.

Although not shown, once the multicopter gets close to some desired destination, the multicopter comes to a forward stop and hovers in the air (e.g., similar to position 320), then descends vertically to perform a vertical landing and lands on the water (340). The landing sequence is the reverse of the path described earlier.

Under some conditions such as high temperature days or high duty cycles corresponding to various points in a flight sequence, the batteries may be working harder to supply the needed current for a desired torque and thrust. This causes the batteries to generate heat, which may increase the chance of battery failure, decrease the lifespan of the batteries, decrease the flight time of the vehicle if the heat is not dissipated, etc. Moreover, sometimes the conductive properties of the float do not provide sufficient cooling. Additional or more efficient cooling can be provided by introducing air into the float. As further described below, heat is dissipated from the batteries by opening a flap in the float to allow air flow to cool the batteries. The following figures show examples of systems having a spring-loaded flap for air cooling.

For simplicity the following figures show only the float portion of a vehicle (such as vehicle 200) with locations of booms indicated for context. The number and placement of batteries inside the float is merely exemplary and not intended to be limiting.

Figure 4:
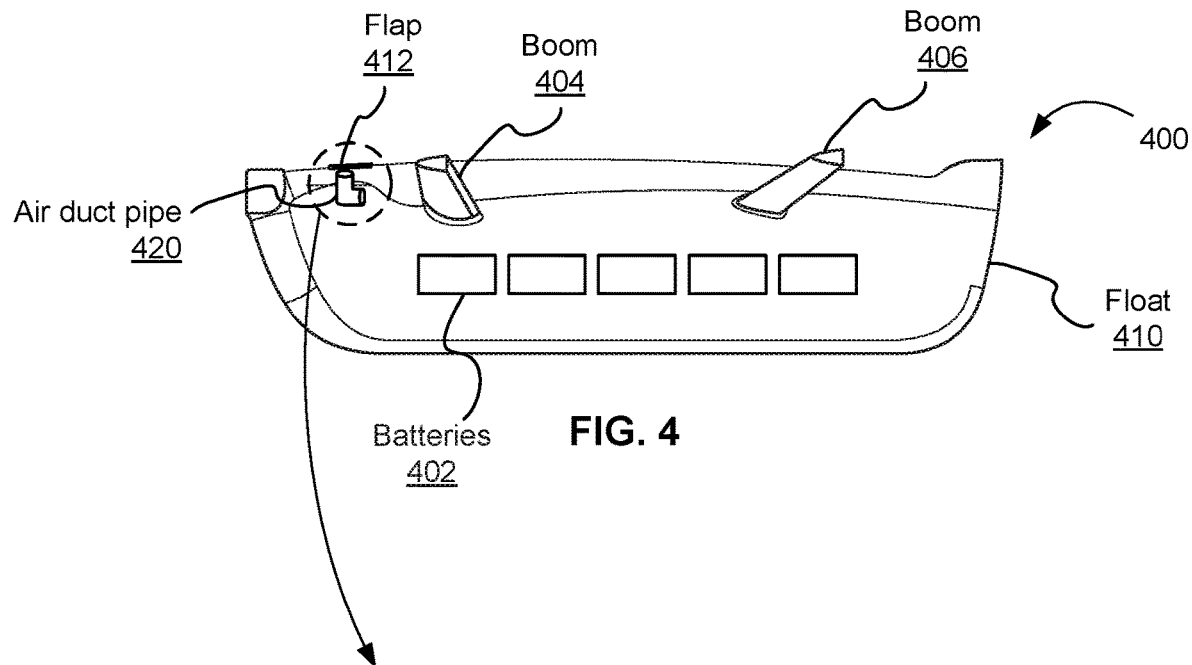
FIG. 4 is a diagram illustrating an embodiment of a system including spring-loaded flaps for air cooling.

FIG. 4 is a diagram illustrating an embodiment of a system including spring-loaded flaps for air cooling. System 400 includes batteries 402, float 410, and flap 412. For simplicity, propellers are not shown. The propellers are coupled to a vehicle (such as a float and/or booms 404 and 406) to propel the vehicle. The vehicle is capable of taking off and/or landing on water. Examples of propellers are described with respect to FIGS. 1 and 2.

Batteries 402 are provided inside a float 410, and are configured to power the propellers in the vehicle. As described with respect to FIG. 1, a battery supplies the necessary current for the torque required by a propeller to output the necessary thrust requested by a flight controller.

Figure 6:
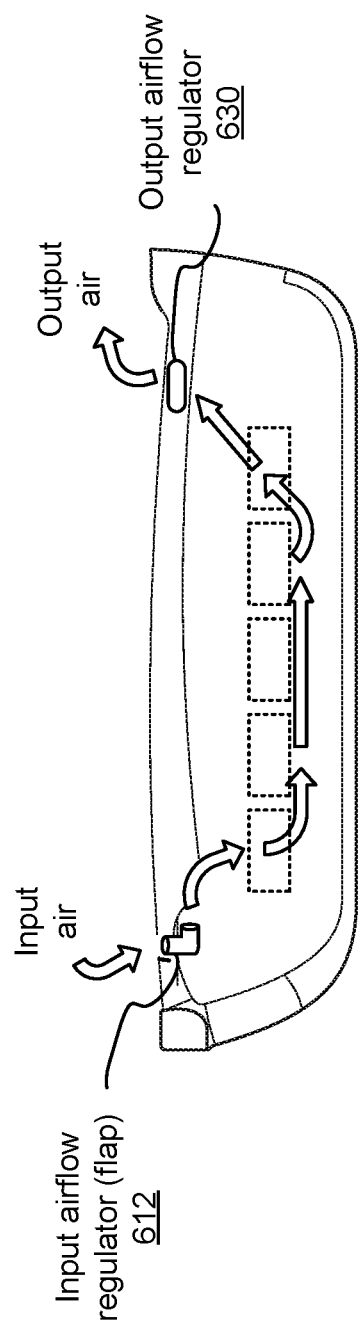
FIG. 6 illustrates an example of airflow in a system having spring-loaded flaps for air cooling.

Float 410 is configured to hold one or more batteries. As described with respect to FIG. 1, it may be attractive to provide batteries in the float for safety reasons. The disclosed techniques to introduce air into the float allow the batteries to be cooled, which improves the performance of the batteries and consequently the functioning of the vehicle. FIG. 6 shows an example of airflow through the float to cool batteries.

Returning to FIG. 4, flap 412 is configured to open in response to air pressure to permit airflow to cool the battery. For example, when air pressure reaches a threshold, flap 412 reacts by swinging down (e.g., via a hinge or spring) to permit air to reach air duct 420. The drawing here is not necessarily to scale. As will be shown in more detail below in FIGS. 5A and 5B, there is sufficient clearance for flap 412 to swing down without hitting air duct 420.

In this example, flap 412 is provided under the propeller of a vehicle. In other words, at least one propeller is provided on float 410 (or boom 404/406) and positioned over flap 412. The air pressure generated by the spinning of the propellers causes flap 412 to open to introduce air into the float via air duct 420 as further described below. This may be attractive because when a propeller spins faster, the batteries are working harder and generating more heat. The propeller also causes more air pressure on flap 412 when the propeller spins faster, so the flap will open to allow air to enter the float via air duct 420 and cool the batteries.

The next figures show a close-up view of flap 412 and air duct 420.

Figure 5A:
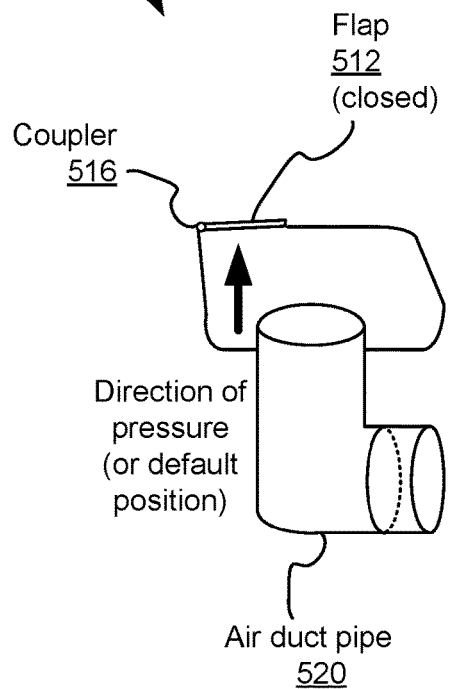
FIG. 5A is a diagram illustrating an embodiment of a spring-loaded flap for air cooling in a closed state.

FIG. 5A is a diagram illustrating an embodiment of a spring-loaded flap for air cooling in a closed state. In this example, flap 512 is spring-loaded (e.g., torsional spring) and is configured to be closed until the air pressure meets a threshold. Flap 512 is closed because there is insufficient air pressure pushing downwards on the flap or the pressure is pushing in the direction of the arrow (up against the flap). In various embodiments, a closed flap position shown here is the default position. That is, the flap opens in response to sufficient air pressure (which is downwards in this example) but otherwise stays closed.

Flap 512 is coupled to the vehicle (e.g., float 410) via a coupler 516. Flap 512 is passively actuated by the coupler 516, which may be a spring, bearing, or the like. In a closed position, flap 512 is positioned as shown to close off (or seal) the float to prevent debris, particles, and (in some cases) water from entering air duct 520 and the float.

Figure 5C:
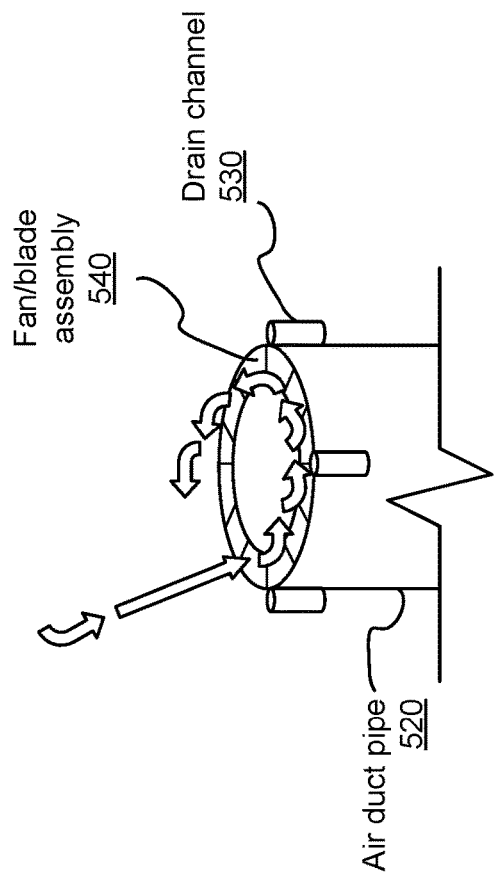
FIG. 5C is a diagram illustrating an embodiment of a fan assembly for a spring-loaded system for air cooling.
Figure 5B:
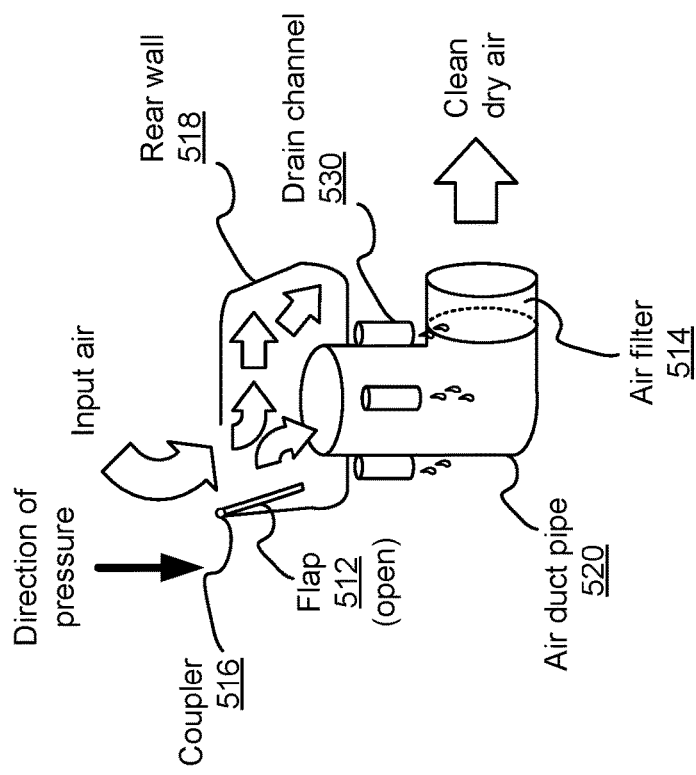
FIG. 5B is a diagram illustrating an embodiment of a spring-loaded flap for air cooling in an open state.

FIG. 5B is a diagram illustrating an embodiment of a spring-loaded flap for air cooling in an open state. Flap 512 swings down via coupler 516 to open and allow input air to enter the float via air duct 520. Flap 512 opens in response to sufficient air pressure in the direction indicated by the arrow. The air pressure can vary due to various causes such as actuation of the propeller, a propeller spinning at a certain speed, and/or the vehicle being oriented in a particular position in hovering or forward flight mode.

Coupler 516 can be selected based on the desired response to a level of air pressure. In various embodiments, the properties of coupler 516 define the threshold air pressure that causes the flap to open. In other words, an amount of air pressure to open the flap is determined by a resistive property of the flap. As another example, a torsional spring with less tension can be used if the flap is to be opened more easily. For example, one type of coupler can be used if it is desired that the actuation of propellers in a vehicle hover mode causes the flap to open while another type of coupler can be used if it is desired that the actuation of propellers in a vehicle forward flight mode causes the flap to open.

For example, referring to FIG. 3, the batteries may generate more heat when the propellers reach a thrust indicating take off in hover or flight (310). However, it may be desirable to keep the flap closed when the vehicle is taking off and/or landing (310 and 340) to prevent debris or moisture from getting into the float. If so, an appropriate spring type and/or strength may be selected to keep the flap closed during takeoff and/or landing (if desired).

Returning to FIG. 5B, the input air passes through air duct 520. The curvature of air duct 520 reduces the dust and moisture (e.g., water, mist, dirt) taken into the pipe because the heavier dust and moisture particles are forced against the back/sides of the air duct such as towards the rear wall 518. The particles can then be vented through drain channels 530 that drain matter outside (external to) the float. The drain channels are exhaust through which particles are removed from the air duct pipe. In various embodiments, the drain channels include features to prevent backwash such as a check valve or the feature shown in FIGS. 13A and 13B. The cleaner and drier air then passes through the air duct pipe 520 and through air filter 514, which provides additional cleaning of the air. Air filter 514 is configured to filter out particles such as dust and moisture as air travels through the filter so that the input air exits the air duct as clean dry air.

In various embodiments, the system includes an assembly that generates a vortex to remove or separate dust/moisture from the rest of the air. The next figure shows one such example.

FIG. 5C is a diagram illustrating an embodiment of a fan assembly for a spring-loaded system for air cooling. For simplicity, this view shows a top portion of the air duct pipe 520 before the turn in the pipe. A fan (or blade assembly) 540 is provided at the top opening of the air duct pipe 520. The blades in the fan is adapted to be rotated to separate dust/water particles from the air. The rotating blade creates a vortex (represented by the arrows) and the centrifugal force forces dust particles or water to exit via drain channel 530.

In the examples above, there are three visible exhausts or drain slots but this is merely exemplary and not intended to be limiting. For example, depending on expected debris, more or fewer exhausts are provided. Removing particles and moisture helps to keep the interior of the float in good condition because they may damage the interior of the float including the batteries. The air then flows around/through the batteries to cool the batteries. An example of an air flow path through the float is shown in the next figure.

FIG. 6 illustrates an example of airflow in a system having spring-loaded flaps for air cooling. This figure shows an example of a float and includes the same components as FIG. 4 unless otherwise described. Here, the booms and propellers are not shown to more clearly illustrate an example airflow path.

Figure 9:
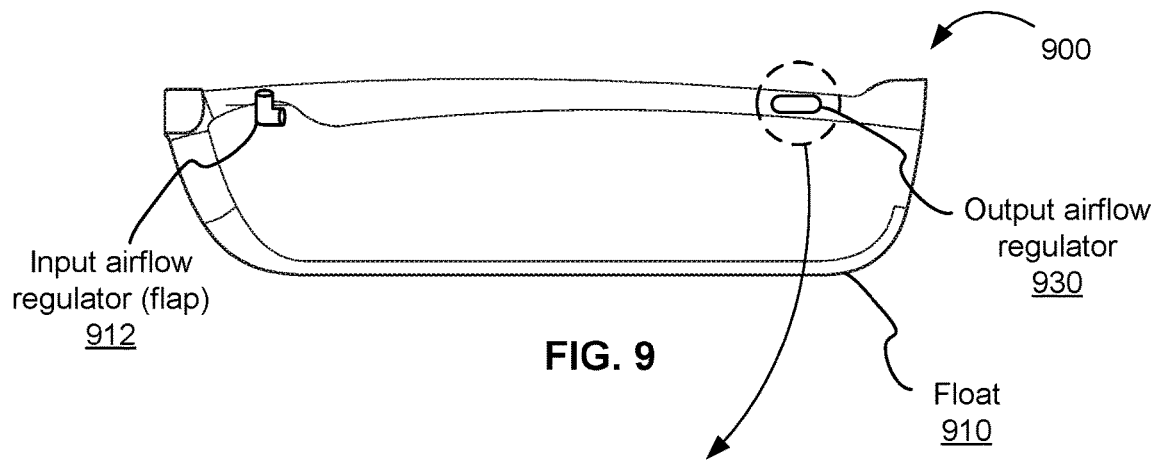
FIG. 9 is a diagram illustrating an embodiment of a system including an output airflow regulator.

The system includes an input airflow regulator 612 and an output airflow regulator 630. Input airflow regulator 612 is configured to manage air drawn into the float (including preventing air or other particles from entering the float). An example of an input airflow regulator is the flap and air duct assembly shown in FIG. 4. Output airflow regulator 630 is configured to manage air exiting the float. An example of an output airflow regulator is shown in FIG. 9.

As shown, input air enters via the input airflow regulator 612, descends towards the bottom of the float, passes across the length of the float, and exits up and out of the float via output airflow regulator 630. The batteries (in dashed lines) are shown to provide context for how the airflow cools the batteries. The cool dry air entering from the left side of the batteries and passing across the batteries dissipates heat by convection. Cool dry air is continually drawn into the float and flows through and exits the float in the path shown as long as the input airflow regulator 612 permits air to enter. As described herein, the input airflow regulator permits air to enter the float in response to air pressure meeting a threshold, which also corresponds to when the batteries are generating more heat and would benefit from being cooled.

In this example the air enters and exits the float from a top of the float, but in other embodiments, the air enters and/or exits from a side of the float. The next figure shows an example in which the input airflow regulator is provided at the side of a float.

FIG. 7 is a diagram illustrating an embodiment of a system including spring-loaded flaps for air cooling oriented for air intake at a side of a float. System 700 includes batteries 702, booms 704 and 706, and float 710. Each of these components is like their counterparts in FIG. 4 unless otherwise described.

Here, flap 712 is oriented to permit air to enter from a side of the float in contrast to flap 412 of FIG. 4, which is oriented to permit air to enter from a top of the float. Flap 712 operates similarly to flap 412 by opening (here swinging to the right) in response to air pressure meeting a threshold. The next figures show a close-up view of flap 712 and air duct 720.

FIG. 8A is a diagram illustrating a spring-loaded flap for air cooling oriented for air intake at a side of a float in a closed state. In various embodiments, flap 812 is spring-loaded and is configured to be closed until the air pressure meets a threshold. In this example, air pressure from the left of the flap causes the flap to open as further described with respect to FIG. 8B. In various embodiments, a closed flap position shown here is the default position.

FIG. 8B is a diagram illustrating a spring-loaded flap for air cooling oriented for air intake at a side of a float in an open state. Flap 812 swings to the right via coupler 816 to open and allow input air to enter the float via air duct 820. The input air passes through air duct 820. Air filter 814 is configured to filter out particles such as dust and moisture as air travels through the filter so that the intake air exits the air duct as clean dry air.

Cool dry air exits from the bottom of the air duct and passes through the interior of the float flowing over/under/around the batteries and exits the float. In various embodiments, the output air is regulated to prevent particles and moisture from entering the float via an air passage exit. The next figures show an example of an output airflow regulator.

FIG. 9 is a diagram illustrating an embodiment of a system including an output airflow regulator. System 900 includes a float 910 and an output airflow regulator 930. System 900 includes the same components of FIG. 6 unless otherwise described. An input airflow regulator 912 is also shown for context. The output airflow regulator is configured to manage the flow of air exiting the float including closing off the exit to prevent particles or moisture or backwash from entering the float. The next figures show a close-up view of output airflow regulator 930.

Figure 10:
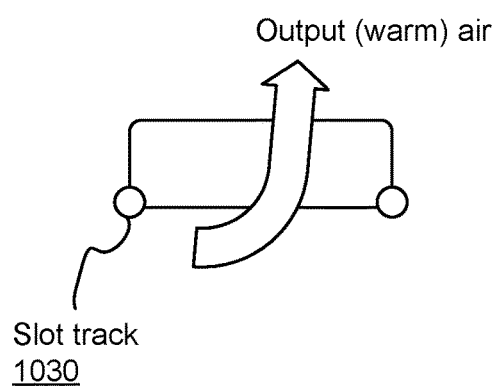
FIG. 10 is a diagram illustrating an embodiment of an output airflow regulator.

FIG. 10 is a diagram illustrating an embodiment of an output airflow regulator. In this example, output air is regulated by a slot track 1030. Here, the slot track is open permitting the air to exit up and out of the float in the path shown. The output air can be regulated by other devices such as a spring-loaded flap (similar to the ones described herein), a linear actuator, inline spring load, spring loaded Y, ball, diaphragm, spring lift disc, swing titled disc, butter fly, duck bill, or the like. The slot track can be closed when the input airflow regulator is closed and there is no air that needs to exit the float. In various embodiments, the slot track is closed in a default state to prevent debris or moisture from entering the float. Although the output airflow regulator is depicted in FIG. 9 as being at the top of the float, this is not intended to be limiting and the output airflow regulator may be located in other places on the float. The next figure shows an example of a different location of the output airflow regulator.

Figure 11:
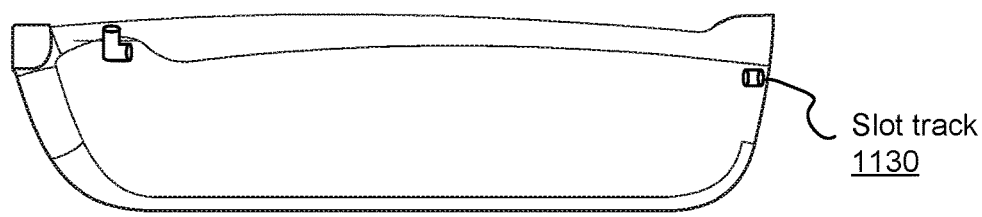
FIG. 11 is a diagram illustrating an embodiment of a system including an output airflow regulator oriented to guide air to exit at a side of a float.

FIG. 11 is a diagram illustrating an embodiment of a system including an output airflow regulator oriented to guide air to exit at a side of a float. The input airflow regulator is also shown here for context. Unlike the example in FIG. 10, the slot track 1130 is located at the side of the float so that output air exits from the side of the float instead of the top of the float.

In various embodiments, the output airflow regulator has additional features or is a separate mechanism, to prevent moisture from entering the float. The next figures show an example of a mechanism to prevent moisture from entering the float.

Figure 12:
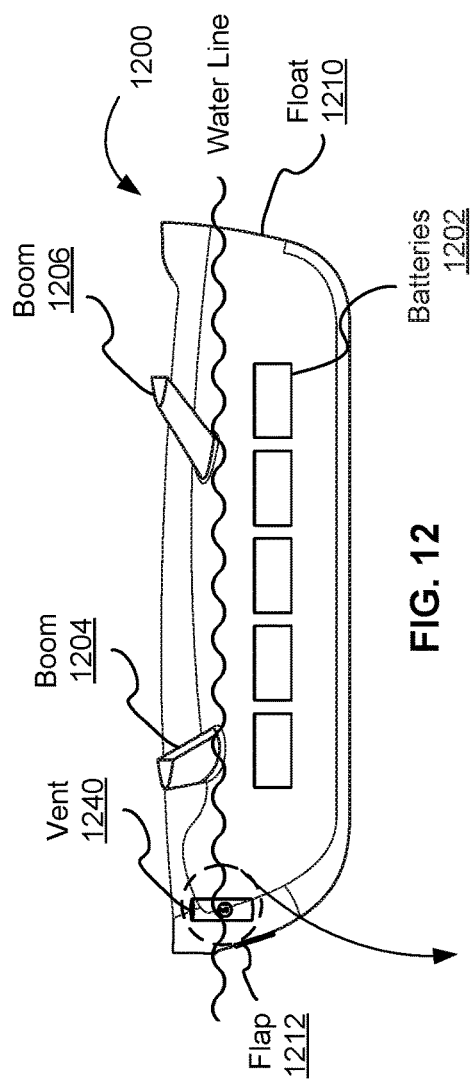
FIG. 12 is a diagram illustrating an embodiment of a system including a vent to prevent moisture or liquid from entering.

FIG. 12 is a diagram illustrating an embodiment of a system including a vent to prevent moisture or liquid from entering. System 1200 includes batteries 1202, booms 1204 and 1206, and float 1210. Each of these components are like their counterparts in FIG. 4 unless otherwise described. In this example, a portion of the vehicle (namely a portion of float 1210) is underwater. This means that there is a risk of water/moisture entering the float, which can damage the batteries.

Vent 1240 (sometimes called a gate) provided in float 1210 is configured to close in the presence of water. In some embodiments, the features shown here form a discrete component from the input airflow regulator or output airflow regulator and can be provided separately from airflow regulators (e.g., in series) to prevent water from entering the float. In some embodiments, the features shown here are integrated with the input airflow regulator or output airflow regulator described above. For example, vent 1240 is integrated with the input airflow regulator (flap 1212 and air duct assembly).

The next figures show a close-up view of vent 1240.

Figure 13B:
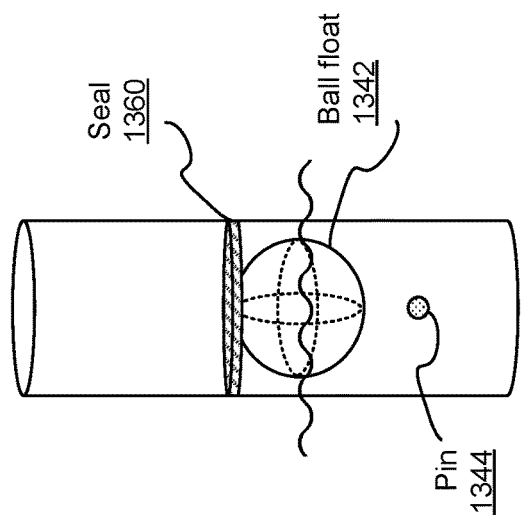
FIG. 13B is a diagram illustrating an embodiment of a system including a vent having a ball float to prevent water from entering.
Figure 13A:
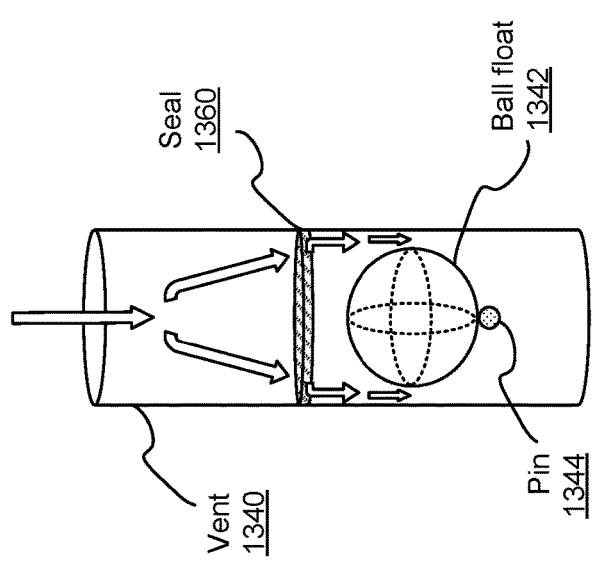
FIG. 13A is a diagram illustrating an embodiment of a system including a vent having a ball float permitting air to enter.

FIG. 13A is a diagram illustrating an embodiment of a system including a vent having a ball float permitting air to enter. Vent 1340 includes a seal 1360, a pin 1344, and a ball float 1342 configured to prevent moisture from entering the float when at least partially submerged and to permit airflow into the float when not submerged to permit air to enter. Seal 1360 has an inner diameter so that when the ball float is not contacting the seal air is permitted to flow into and out of the tube, and when the ball float contacts the seal, a water-tight seal is formed to prevent liquid from entering the tube. The ball float is a passive buoyancy activated device that seals the air duct when submerged underwater. Ball float 1342 falls to the position shown here when not submerged to permit air to enter the air duct. Pin 1344 defines an extent to which the ball float can drop downwards to prevent the ball float from being lost. As shown, when the ball float contacts pin 1344, there is an air gap between the ball float and the seal. An example air path is shown where the air flows into air duct, around ball float 1342, and into the float. Letting air in permits air cooling of the float contents such as electronics.

FIG. 13B is a diagram illustrating an embodiment of a system including a vent having a ball float to prevent water from entering. Ball float 1342 is provided inside vent 1340 to prevent water from entering the air duct and into the float of the vehicle.

Ball float 1342 rises to the position shown when submerged to prevent water from entering the air duct. In this state, ball float 1342 is submerged because a portion of the float is below the indicated water line. Thus, the ball float moves up (in relation to FIG. 13A) to prevent water from entering the air duct past the float. The ball float is but an example of a passive buoyancy activated device and others such as a flap, stopper, level, check valve (duck bill, lift button fly, etc.) are possible. Although the walls in FIGS. 13A and 13B are depicted as straight, they are tapered in other embodiments so that the bottom of the tube is wider than the top of the tube. The next figures show examples of other ways to prevent water from entering the float.

Figure 14B:
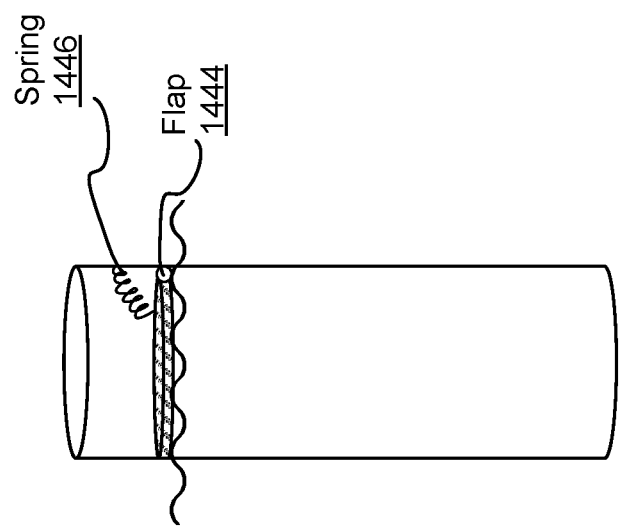
FIG. 14B is a diagram illustrating an embodiment of a system including a buoyant spring flap to prevent water from entering.
Figure 14A:
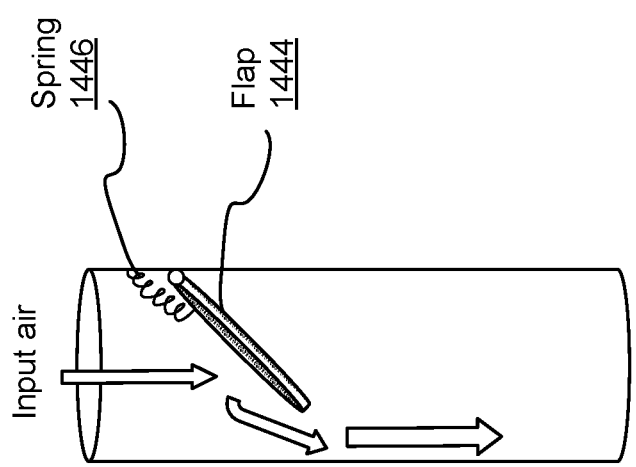
FIG. 14A is a diagram illustrating an embodiment of a system including a buoyant spring flap permitting air to enter.

FIG. 14A is a diagram illustrating an embodiment of a system including a buoyant spring flap permitting air to enter. The system includes a flap 1444 and spring 1446 assembly configured to prevent moisture from entering the float when at least partially submerged and to permit airflow into the float when not submerged to permit air to enter. The flap 1444 is a passive buoyancy activated device that seals the air duct when a bottom surface of the flap contacts liquid. Flap 1444 falls to the position shown here when not contacting water to permit air to enter the air duct. An example air path is shown where the air flows into air duct, around flap 1444, and into the float. Letting air in permits air cooling of the float contents such as electronics.

FIG. 14B is a diagram illustrating an embodiment of a system including a buoyant spring flap to prevent water from entering. Flap 1444 rises to the position shown when a bottom surface contacts water to prevent the water from entering the air duct. The flap 1444 moves up (in relation to FIG. 14A) via compressed spring 1446 to close/seal the air duct and prevent water from entering the air duct past the float. The flap 1444 may be sized and have sealing properties so that when in the position shown in FIG. 14B, the tube is sealed to prevent water from traveling up beyond the flap.

Figure 15B:
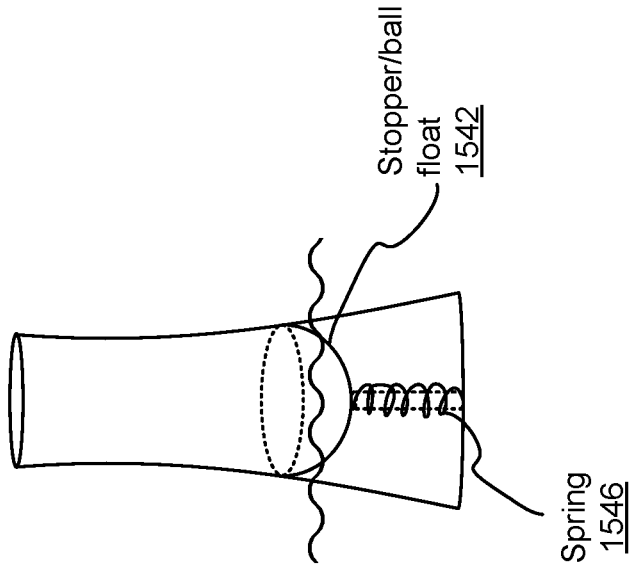
FIG. 15B is a diagram illustrating an embodiment of a system including a stopper to prevent water from entering.
Figure 15A:
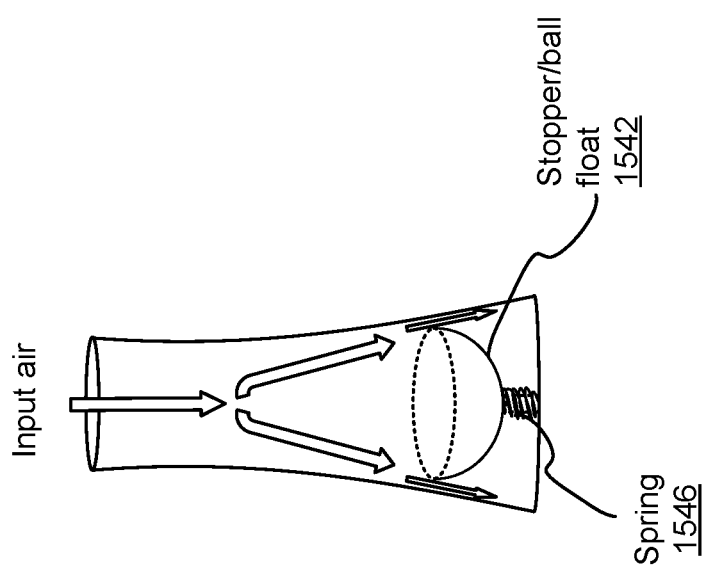
FIG. 15A is a diagram illustrating an embodiment of a system including a stopper permitting air to enter.

FIG. 15A is a diagram illustrating an embodiment of a system including a stopper permitting air to enter. The system includes a stopper 1542 and spring 1546 assembly configured to prevent moisture from entering the float when at least partially submerged and to permit airflow into the float when not submerged to permit air to enter. When there is sufficient air flow into the air duct, the force of the air presses on spring 1546, causes it to compress that stopper 1542 falls to the position shown. An example air path is shown where the air flows into air duct, around stopper 1542, and into the float. Letting air in permits air cooling of the float contents such as electronics.

FIG. 15B is a diagram illustrating an embodiment of a system including a stopper to prevent water from entering. Stopper 1542 includes a ball float (here, half a ball float), which is a passive buoyancy activated device that seals the air duct when submerged underwater. Stopper 1542 floats/rises to the position shown when submerged to prevent water from entering (back flowing into) the air duct. In this state, stopper 1542 is submerged because a portion of the float is below the indicated water line. Thus, the ball float moves up (in relation to FIG. 15A), to close/seal the air duct and prevent water from entering the air duct past the float.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system comprising:
   a propeller coupled to an aircraft capable of at least one of: taking off from and landing on water;
   a battery configured to power the propeller;
   a float configured to provide buoyancy for the aircraft and to hold the battery; and
   a flap provided on a face of the float, wherein the flap is configured to open in response to air pressure to permit airflow into the float to cool the battery.

2. The system of claim 1, wherein the flap is provided under the propeller of the aircraft.

3. The system of claim 1, wherein the flap is spring-loaded and is configured to open and permit airflow in response to the air pressure.

4. The system of claim 3, wherein a level of air pressure to open the flap is determined by a resistive property of the flap.

5. The system of claim 1, wherein the flap is operable to open and close via a torsional spring.

6. The system of claim 1, wherein the air pressure is caused at least in part by actuation of the propeller.

7. The system of claim 1, wherein the flap opens in response to air pressure caused by the propeller actuated in an aircraft hover mode.

8. The system of claim 1, wherein the flap opens in response to air pressure caused by the propeller actuated in an aircraft forward flight mode.

9. The system of claim 1, wherein the flap is configured to be closed when the aircraft is at least one of landing and taking off.

10. The system of claim 1, wherein the flap is configured to be closed when the aircraft is at least one of landing and taking off on water.

11. The system of claim 1, further comprising an air filter configured to filter out particles and moisture as air travels through the air filter.

12. The system of claim 1, wherein the flap is oriented to permit air to enter from a top of the float.

13. The system of claim 1, wherein the flap is oriented to permit air to enter from a side of the float.

14. The system of claim 1, further comprising a vent in the float configured to close in response to the presence of water.

15. The system of claim 14, wherein the vent includes a ball float configured to permit airflow into the float when not submerged.

16. The system of claim 14, wherein the vent includes a ball float configured to prevent liquid from entering the float when the ball float at least partially submerged.

17. The system of claim 14, wherein the vent is oriented to prevent water from entering a top of the float.

18. The system of claim 14, wherein the vent is oriented to prevent water from entering a side of the float.

19. The system of claim 14, wherein the vent is substantially aligned with the flap.

20. A method comprising:
    providing a propeller coupled to an aircraft capable of at least one of: taking off from and landing on water;
    providing a battery configured to power the propeller;
    providing a float configured to provide buoyancy for the aircraft and to hold the battery; and
    providing a flap provided on a face of the float, wherein the flap is configured to open in response to air pressure to permit airflow into the float to cool the battery.

* * * * *